Patented Apr. 14, 1931

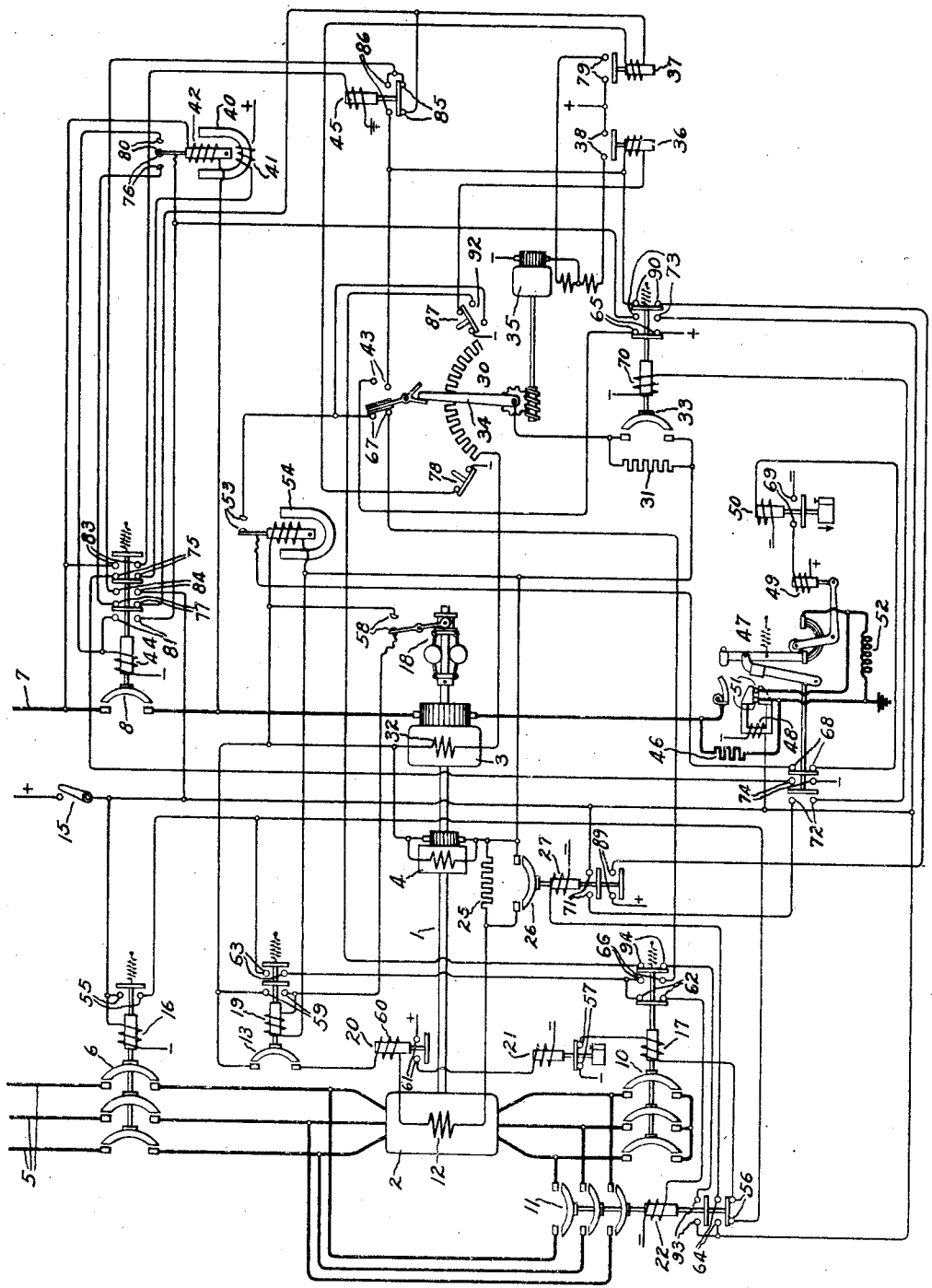

1,801,242

UNITED STATES PATENT OFFICE

HERMAN BANY, OF YEADON, PENNSYLVANIA, ASSIGNOR TO GENERAL ELECTRIC COMPANY, A CORPORATION OF NEW YORK

AUTOMATIC CONTROL EQUIPMENT

Application filed December 12, 1929. Serial No. 413,653.

My invention relates to automatic control equipments and particularly to equipments for controlling the voltage of an automatic station and the connection thereof to an electric circuit and its object is to provide an arrangement for controlling the voltage controlling means in such a manner that it is in a position to produce substantially normal voltage during the starting operation of the station, in order that when the station is started the voltage may build up quickly to its normal value, and for controlling the voltage controlling means in such a manner after the station is in operation and has been disconnected from the electric circuit in response to an abnormal load thereon, that the station cannot be reconnected to the electric circuit until after the voltage controlling means has operated to decrease the station voltage to a predetermined minimum value.

My invention will be better understood from the following description when taken in connection with the accompanying drawing which diagrammatically illustrates an embodiment of my invention in connection with an automatic control equipment for a motor generator set and its scope will be pointed out in the appended claims.

Referring to the drawing, 1 represents a synchronous motor generator set comprising a synchronous motor 2 which drives a direct current generator 3 and an exciter 4 for the synchronous motor 2 and the generator 3. The motor 2 is arranged to be connected to a suitable polyphase supply circuit 5 by means of a suitable circuit breaker 6 and the direct current generator 3 is arranged to be connected to a direct current load circuit 7 by means of a suitable circuit breaker 8. In order that a relatively low voltage may be impressed across the armature windings of the synchronous motor 2 to start the motor and a relatively high voltage may be impressed across the armature windings after the motor has been started and brought into synchronism with the supply circuit 5, a suitable starting switch 10 is provided which, when closed, connects the armature windings of the motor 2 in star across the supply circuit 5, and a running switch 11 is provided which, when closed, connects the armature windings of the motor 2 in delta across the supply circuit 5.

The synchronous motor 2 is provided with a field winding 12 which is arranged to be connected across the exciter 4 by means of a suitable field switch 13.

In order that the various switches associated with the motor 2 may be automatically operated in the proper sequence to start the motor and bring it into synchronism with the supply circuit 5, any suitable automatic control equipment, examples of which are well known in the art, may be provided for controlling the operation of the switches. In the particular arrangement shown in the drawing, the starting of the synchronous motor 2 is effected by the closing of a hand-switch 15 which, when closed, completes an energizing circuit for the closing coil 16 of the circuit breaker 6. The closing of the circuit breaker 6 completes an energizing circuit for the closing coil 17 of the starting breaker 10 so that a relatively low voltage is impressed across each phase of the armature winding of the synchronous motor to start the motor. In order that the field winding 12 of the motor may be energized after the motor reaches substantially synchronous speed, suitable speed responsive means such as a speed switch 18 is provided which is arranged to complete an energizing circuit for the closing coil 19 of the field switch 13 when the speed of the motor 2 is above a predetermined value. In order to effect the opening of the starting breaker 10 and the closing of the running breaker 11 after the field switch 13 has been closed to energize the field winding 12, a current relay 20 is provided in the circuit of the field winding 12. As soon as the field current builds up to a predetermined value, the relay 20 operates to complete an energizing circuit for a time relay 21 which, after a predetermined time, effects the deenergization of the closing coil 17 of the starting switch 10 so that the starting switch 10 opens. The opening of the starting switch 10 completes an energizing circuit for the closing coil 22 of the running switch 11 so that a relatively high voltage is impressed across each phase of the armature winding of the motor 2.

Since the value of field excitation required to pull a synchronous motor into synchronism with the least voltage disturbance on the supply circuit is usually less than the normal running value of field excitation, it is the practice in some cases to provide a suitable current limiting device such as a resistor 25 in the motor field circuit at the time the field circuit is completed and a suitable switch 26 to short-circuit the resistor 25 after the motor has pulled into synchronism. In the arrangement shown in the drawing, the closing of the running switch 11 is arranged to complete an energizing circuit for the closing coil 27 of the motor field changing switch 26 when the running switch 11 closes.

After the starting operation of the motor 2 has been completed, the generator 3 is placed in a condition to supply current and then the generator is connected to the load circuit 7. In order for the generator 3 to supply current to the load circuit 7 when it is energized from some other source, not shown, it is necessary for the voltage of the generator 3 to be higher than the voltage of the load circuit 7. Therefore it is desirable to provide suitable voltage regulating means for automatically controlling the generator voltage so that it is higher than the load circuit voltage before the circuit breaker 8 is closed. In the arrangement shown, this result is accomplished by providing an adjustable rheostat 30 in the circuit of the generator field winding 32 which is arranged to be connected across the terminals of the exciter 4 by means of a suitable field switch 33 after the motor field changing switch 26 is closed. In order that the switch 33 may not have to open the field circuit completely a suitable high resistor 31 is connected in shunt across the terminals of the switch 33. The movable arm 34 of the adjustable rheostat 30 is adjusted by means of a suitable motor 35 the circuit of which is controlled by two control relays 36 and 37 which control the connections of the motor 35 so that the rheostat 30 is moved in a direction to lower the generator voltage when the control relay 36 is energized and in a direction to increase the generator voltage when the control relay 37 is energized. After the generator field switch 33 is closed and before the circuit breaker 8 is closed to connect the generator 3 to the load circuit 7, the operation of the motor operated rheostat 30 is controlled by means of a voltage differential relay 40, which is responsive to the relative voltages of the generator 3 and the load circuit 7, so that the generator voltage is increased to a value above the load circuit voltage. As shown in the drawing, the voltage differential relay 40 is of the directional type and includes a polarizing winding 41 which is energized from any suitable source of direct current having a predetermined polarity and an operating winding 42 which is connected in shunt to the main terminals of the circuit breaker 8 so that it is energized in response to the difference between the voltages of the generator 3 and the load circuit 7. When the generator voltage is below the load circuit voltage, the voltage differential relay 40 is arranged to complete an energizing circuit for the control relay 37 so that the rheostat 30 is adjusted to increase the generator voltage. As soon as the generator voltage exceeds the load circuit voltage more than a predetermined amount, the voltage differential relay 40 completes an energizing circuit for the closing coil 44 of the circuit breaker 8 so that the generator 3 is connected directly to the load circuit 7.

After the circuit breaker 8 closes, the motor operated rheostat 30 may be placed under the control of any suitable control means, examples of which are well known in the art, so as to regulate the generator voltage in a manner to maintain constant a desired electric condition of the load circuit. As shown in the drawing, the closing of the circuit breaker 8 places the rheostat 30 under the control of a voltage relay 45 which is responsive to the voltage of the load circuit 7 so that the rheostat 30 is adjusted to maintain the load circuit voltage constant at a predetermined value.

In order to protect the generator 3 against excessive overloads and short-circuits and also to limit the amount of current the circuit breaker 8 has to interrupt under such abnormal conditions, a suitable current limiting device, such as a resistor 46, is arranged to be connected in series with the generator 3 and the load circuit 7 in response to such abnormal load conditions. As shown, the resistor 46 is normally short-circuited by a circuit breaker 47 of the well known quick-acting type which comprises a holding coil 48, a closing coil 49, an auxiliary control relay 50 for the closing coil 49, a flux diverting winding 51 which is connected in series with the generator 3 and the load circuit 7, and a reactor 52 which is connected in shunt with the winding 51. As is well known in the art, this reactor 52 causes the circuit breaker 47 to open in response to a lower value of current under short-circuit conditions than is required to open the breaker under normal overload conditions.

The circuit breaker 47 is arranged so that it has to be closed before the circuit breaker 8 can close to connect the generator 3 to the load circuit 7 and also it is arranged so that the circuit breaker 8 is subsequently opened whenever the circuit breaker 47 is opened by an abnormal current condition.

Whenever the circuit breakers 47 and 8 are opened in response to an overload or a short-circuit it is desirable first to reduce the generator voltage to its minimum value before the circuit breaker 8 is reclosed to connect the generator 3 to the load circuit 7. Therefore, in the arrangement shown, the relay 50 is so connected that whenever the circuit breaker 47 is opened after the generator 3 has been placed in operation to supply current, the circuit breaker 47 can be reclosed only after the rheostat 30 has been moved to its minimum voltage position.

In order, however, that the time delay required for the rheostat 30 to move from its minimum voltage position to a position to produce substantially normal voltage may be eliminated during the starting operation of the motor generator set, I provide, in accordance with my invention, an arrangement for controlling the rheostat 30 and the closing of the circuit breaker 47 so that during the starting of the motor generator set the rheostat 30 remains in a position to produce substantially normal voltage and the circuit breaker 47 is closed independently of the movement of the rheostat 30 to its minimum voltage position. This is an important feature as it is very essential in many cases to have the starting operation of the automatic station completed as quickly as possible.

In the particular embodiment of my invention shown in the drawing, this result is accomplished by providing an arrangement for closing the circuit breaker 47 when the starting switch 10 of the motor 2 is closed and the exciter voltage is above a predetermined value and has the proper polarity to effect the closing of the contacts 53 of a suitable polarized voltage relay 54. Therefore, during the starting operation of the motor generator set the circuit breaker 47 can be closed independently of the movement of the rheostat 30 to its minimum voltage position. After the starting operation of the motor has been completed, however, it is necessary for the rheostat 30 to be in its minimum voltage position before the circuit breaker 47 can be reclosed.

In order that the rheostat 30 may be in its normal no-load voltage position during the starting operation of the motor generator set 1, the generator field switch 33, when in its open position, is arranged to complete an energizing circuit for the control relay 36 if the rheostat is in a position to produce an abnormal no-load voltage so that the auxiliary contacts 43 associated with the rheostat are closed. In order to effect the movement of the rheostat 30 to its minimum voltage position when the circuit breaker 47 is open after the starting operation of the motor generator set 1 has been completed, a circuit for the control relay 36 is arranged to be completed when the generator field switch 33 is open and the motor field changing switch 26 is closed, which is closed only after the motor starting operation has been completed.

The operation of the arrangement shown in the drawing is as follows: When it is desired to place the motor generator set 1 in operation the control switch 15 is closed to complete an energizing circuit for the closing coil 16 of the circuit breaker 6 so that the armature windings of the motor 2 are connected to the supply circuit 5. As soon as the circuit breaker 6 closes, a circuit is completed for the closing coil 17 of the starting switch 10 to connect the armature windings of the motor 2 in star across the supply circuit 5. The circuit of the closing coil 17 is from one side of a suitable control circuit through the switch 15, auxiliary contacts 55 on the circuit breaker 6, auxiliary contacts 56 on the running switch 11 closing coil 17 of the starting switch 10, contacts 57 of the control relay 21 to the other side of the control circuit.

As soon as the starting switch 10 is closed, the rotor of the motor 2 begins to accelerate and as soon as the rotor speed reaches a predetermined value, the speed switch 18 closes its contacts 58 and completes an energizing circuit for the closing coil 19 of the motor field switch 13. This energizing circuit is from one terminal of the exciter 4 through the contacts 58 of the speed switch 18, closing coil 19 of the motor field switch 13 to the other side of the exciter 4. It will be observed that since the exciter 4 is driven by the synchronous motor 2 it is necessary for the exciter voltage to build up to a predetermined value before the field switch 13 can be closed. By closing its auxiliary contacts 59, the field switch 13 completes a locking circuit for its closing coil 19 which is independent of the contacts 58 of the speed switch 18. By closing its main contacts, the field switch 13 connects the motor field winding 12, the current limiting resistor 25 and the winding 60 of the current relay 20 in series across the terminals of the exciter 4. As soon as the motor field current builds up to a predetermined value, the field relay 20 closes its contacts 61 and completes an energizing circuit for the time relay 21 which, after a predetermined time, opens its contacts 57 so that the above traced energizing circuit for the closing coil 17 of the starting switch 10 is opened. As soon as the starting switch 10 opens, a circuit is completed, through the auxiliary contacts 62 on the starting switch 10, for the closing coil 22 of the running switch 11. The energizing circuit of the closing coil 22 is from one side of the control circuit through the control switch 15, auxiliary contacts 55 on the circuit breaker 6, contacts 63 on the motor field switch 13, auxiliary contacts 62 on the starting switch 10, closing coil 22 of the running switch 11 to the other side of the control circuit. The energization of the closing coil 22 closes the running switch 11 so that the armature windings of the motor 2 are connected in delta across the supply circuit 5.

The running switch 11 by closing its auxiliary contacts 64 completes an energizing circuit for the closing coil 27 of the motor field changing switch 26 to short-circuit the resistor 25 in the field circuit of the motor 2. The energizing circuit of the closing coil 27 also includes the control switch 15.

During the starting operation of the motor generator set the polarized voltage relay 54 closes its contacts 53 as soon as the exciter voltage builds up to a predetermined value in a predetermined direction. If the relay 54 closes its contacts 53 while the starting switch 10 is closed, which it should do under normal operating conditions an energizing circuit is completed for the control relay 50 to effect the closing of the circuit breaker 47 provided the rheostat 30 is in a position to produce either substantially normal no-load voltage or a voltage below the normal no-load value. The rheostat is in such a position during the starting operation since if it is in a position to produce an abnormal no-load voltage when the generator field switch 33 is open the auxiliary contacts 43 associated with the rheostat 30 are closed and a circuit is completed for the control relay 36 through the auxiliary contacts 65 on the generator field switch 33. The control relay 36 in turn by closing its contacts 38, completes a circuit for the motor 35 so that the rheostat 30 is moved to its normal no-load voltage position in which position the rheostat contacts 43 are opened and the rheostat contacts 67 are closed.

The energizing circuit for the control relay 50 completed during the starting operation, is from one side of the control circuit through the control switch 15, auxiliary contacts 55 on the circuit breaker 6, auxiliary contacts 63 on the motor field switch 13, auxiliary contacts 66 on the starting switch 10, auxiliary contacts 67 on the rheostat 30, contacts 53 of the polarized voltage relay 54, auxiliary contacts 68 on the circuit breaker 47, winding of control relay 50 to the other side of the control circuit. The control relay 50 by closing its contact 69 completes an energizing circuit for the closing coil 49 to close the circuit breaker 47 and thereby short-circuit the current limiting resistor 46 which is connected in series with the generator 3. The circuit breaker 47 by opening its auxiliary contacts 68 interrupts the above traced circuit for the control relay 50 so that this relay becomes deenergized and in turn deenergizes the closing coil 49. The circuit breaker 47, however, remains closed due to the energization of its holding coil 48 which is connected across the control circuit by the control switch 15.

From the above description it will be observed that during the starting operation of the motor generator set the rheostat 30 remains substantially in its normal no-load position and the circuit breaker 47 is closed while the starting switch 10 is closed, provided the exciter voltage builds up its voltage in the right direction while the starting switch 10 is closed.

As soon as the starting operation of the motor 2 is completed by the closing of the motor field changing switch 26, a circuit is immediately completed for the closing coil 70 of the generator field switch 33 to effect the connection of the generator field winding 32 directly across the terminals of the exciter 4. The resistor 31 when in circuit, maintains the current through the generator field winding 32 at such a small value that the generator voltage does not build up to its normal value. This energizing circuit for the coil 70 is from one side of the control circuit through the control switch 15, auxiliary contacts 71 on the motor field changing switch 26, auxiliary contacts 72 on the closed circuit breaker 47, winding 70 of the generator field switch 33 to the other side of the control circuit.

As soon as the generator field switch 33 closes its auxiliary contacts 73, the voltage differential relay 40, the polarizing winding 41 of which is energized through the auxiliary contacts 74 on the closed circuit breaker 47 and the auxiliary contacts 75 on the open circuit breaker 8, is rendered operative to control the operation of the motor operated rheostat 30 and the closing of the circuit breaker 8.

If the generator voltage 3 is lower than the load circuit voltage at the time the auxiliary contacts 73 on the generator field switch 33 are closed, the contacts 76 of the relay 40 are closed and a circuit is completed for the control relay 37 to effect the movement of the motor operated rheostat 30 so as to increase the generator voltage. This circuit of the control relay 37 is from one side of the control circuit through the control switch 15, the auxiliary contacts 73 on the closed generator field switch 33, contacts 76 of the voltage differential relay 40, auxiliary contacts 77 on the open circuit breaker 8, the winding of the control relay 37, limit switch 78 of the rheostat 30 to the other side of the control circuit. The control relay 37, by closing its contacts 79 completes, a circuit for the motor 35 so that the rheostat 30 is moved in the proper direction to increase the excitation of the generator 3 and thereby increase the generator voltage. As soon as the voltage of the generator 3 is increased to a value which exceeds the load circuit voltage more than a predetermined amount, the voltage differential relay 40 closes its contacts 80 and thereby completes an energizing circuit for the closing coil 44 of the circuit breaker 8 to connect the generator 3 directly to the load circuit 7. The energizing circuit of the closing coil 44 is from one side of the control circuit through the control switch 15, auxiliary contacts 73 on the closed generator field switch 33, contacts 80 of the voltage differential relay 40, closing coil 44 of the circuit breaker 8 to the other side of the control circuit.

The circuit breaker 8, by closing its auxiliary contacts 81, completes a locking circuit for its closing coil 44 which is independent of the contacts 80 of the voltage differential relay 40 so that the circuit breaker 8 remains closed when the voltage differential relay 40 subsequently opens its contacts 80. The circuit breaker 8, by opening its auxiliary contacts 75 and 77, removes the control of the motor operated rheostat 30 from the voltage differential relay 40 and by closing its auxiliary contacts 83 and 84 places the motor operated rheostat 30 under the control of the voltage relay 45. The closing of the auxiliary contacts 83 connects the winding of the voltage relay 45 across the load circuit 7 and the closing of the auxiliary contacts 84 renders the contacts of the voltage relay 45 operative to control the energization of the control relays 36 and 37. If the load circuit voltage is below a predetermined value after the circuit breaker 8 closes, the contacts 85 of the voltage relay 45 are closed and a circuit is completed for the control relay 37 to effect an increase in the generator voltage. This circuit of the control relay 37 is from one side of the control circuit through the control switch 15, the auxiliary contacts 84 on the closed circuit breaker 8, the contacts 85 of the voltage relay 45, winding of control relay 37, limit switch 78 on the rheostat 30 to the other side of the control circuit. If the load circuit voltage is above a predetermined value, the contacts 86 of the voltage relay 45 are closed and a circuit is completed for the control relay 36 to effect a decrease in the generator voltage. The circuit of the control relay 36 is from one side of the control circuit through the control switch 15, the auxiliary contacts 84 on the closed circuit breaker 8, the contacts 86 of the voltage relay 45, winding of control relay 36, limit switch 87 on the rheostat 30 to the other side of the control circuit.

Let it be assumed now that while the motor generator set is in operation and the generator 3 is supplying current to the load circuit 7 a short-circuit occurs on the load circuit 7 so that the circuit breaker 47 opens and removes the short-circuit from around the current limiting resistor 46. As soon as the circuit breaker 47 opens, the above traced circuit for the closing coil 70 of the generator field switch 33 is opened at the auxiliary contacts 72 on the circuit breaker 47 so that the generator excitation is reduced. By opening its auxiliary contacts 73, the generator field switch 33 interrupts the above traced holding circuit for the closing coil 44 of the circuit breaker 8 so that the generator 3 is entirely disconnected from the load circuit 7.

The opening of the generator field switch 33 also completes an energizing circuit for the control relay 36 to effect the movement of the motor operated rheostat 30 to its minimum voltage position. This energizing circuit of the control relay 36 is from one side of the control circuit through the auxiliary contacts 89 of the closed motor field changing switch 26, the auxiliary contacts 90 on the open generator field switch 33, winding of control relay 36, limit switch 87 of the rheostat 30 to the other side of the control circuit. This circuit of the control relay 36 remains closed until the movable arm 34 of the rheostat reaches its minimum voltage position in which position the arm 34 opens the limit switch 87 and closes the limit switch 92. The closing of the limit switch 92 completes an energizing circuit for the control relay 50 to effect the closing of the circuit breaker 47. This energizing circuit of the control relay 50 is from one side of the control circuit through control switch 15, auxiliary contacts 93 on the closed running switch 11, auxiliary contacts 94 on the open starting switch, limit switch 92 on the rheostat 30, contacts 53 of the polarized voltage relay 54, auxiliary contacts 68 on the open circuit breaker 47, winding of control relay 50 to the other side of the control circuit. The energization of the control relay 50 completes in the manner above described the energization of the closing coil 49 of the circuit breaker 47 so that the circuit breaker 47 closes and short-circuits the resistor 46. As soon as the circuit breaker 47 closes, the auxiliary contacts 74 thereof again complete the energization of the polarizing winding 41 of the voltage differential relay 40 so that this relay is again operative to control the operation of rheostat 30 as soon as the generator field switch 33 is closed. By closing its auxiliary contacts 73, the circuit breaker 47 also effects in the manner above described the closing of the generator field switch 33. By closing its auxiliary contacts 73, the field switch 33 then renders the voltage differential relay 40 operative to control the generator voltage and the closing of the circuit breaker 8 in the manner above described.

From the above description it will be observed that during the starting operation of the motor generator set, the generator 3 is connected to the load circuit independently of whether or not the rheostat 30 has been moved to its minimum voltage position and that after the initial connection of the generator to the load circuit has been made, it is necessary to move the rheostat 30 to its minimum voltage position before the generator can be reconnected to the load circuit. Therefore during the starting operation it is not necessary under normal conditions to wait for the rheostat to move from its minimum voltage position to a position in which the generator voltage is higher than the load circuit voltage.

While I have, in accordance with the patent statutes, shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States, is:

1. In combination, a source of current, adjustable means for regulating the voltage of said source, an electric circuit, and automatic switching means for placing said source in condition to supply current and subsequently connecting said source to said electric circuit and disconnecting said source from said eletric circuit in response to predetermined abnormal conditions of said electric circuit including means for controlling said regulating means so that it remains in a condition to maintain the source voltage at substantially its normal no-load value while said source is being placed in a current supplying condition and is adjusted so as to reduce the source voltage to a predetermined minimum value before said source can be reconnected to said electric circuit after said source has been disconnected from said electric circuit by said predetermined abnormal conditions of said electric circuit.

2. In combination, a source of current, means for regulating the voltage of said source, a load circuit, and automatic switching means for placing said source in condition to supply current and for connecting said source to said load circuit after said source has been placed in a current supplying condition including means for effecting the initial connection of said source to said load circuit independently of the voltage of said source being reduced to a predetermined minimum value by said regulating means and for effecting any subsequent reconnection of said source while it remains in a current supplying condition only after the voltage of said source has been reduced to said predetermined minimum value by said regulating means.

3. In combination, a source of current, means for regulating the voltage of said source, a load circuit, a circuit breaker between said source and load circuit, means responsive to predetermined abnormal conditions of said load circuit for opening said circuit breaker, and automatic switching means for placing said source in a current supplying condition and for controlling the closing of said circuit breaker including means for effecting the initial closing of said circuit breaker while said regulating means remains in a condition to maintain the source voltage substantially at its normal no-load value and for effecting any subsequent reclosure of said circuit breaker only after said regulating means has first reduced the source voltage to a predetermined minimum value.

4. In combination, a source of current, means for regulating the voltage of said source, a load circuit, a circuit breaker for connecting said source to said load circuit, current limiting means connected in series with said source, a second circuit breaker for short-circuiting said current limiting means, and automatic switching means for placing said source in a current supplying condition and for controlling the closing of said circuit breakers including means for closing said first breaker in response to the relative voltages of said source and load circuit when said second circuit breaker is closed and for effecting the initial closing of said second breaker while said regulating means remains in a condition to maintain the source voltage substantially at its normal value and any subsequent reclosure of said second circuit breaker only after said regulating means has first reduced the source voltage to its minimum value.

5. In combination, a dynamo-electric machine having a field circuit, an adjustable rheostat in said field circuit, an electric circuit, and automatic switching means for starting said machine and connecting it to said electric circuit including means for effecting the initial connection of said machine to said circuit while the adjustable member of said rheostat remains within a predetermined portion of its range of movement and for effecting any subsequent connection of said machine to said circuit while said machine is in operation only after the adjustable member of said rheostat has been adjusted to its minimum voltage position.

6. In combination, a dynamo-electric machine having a field circuit, an adjustable rheostat in said field circuit, an electric circuit, and automatic switching means for starting said machine and connecting it to said electric circuit including means for effecting the initial connection of said machine to said circuit while said rheostat remains in its substantially normal no-load voltage position and for effecting any subsequent connection of said machine to said circuit while said machine is in operation only after said rheostat has been adjusted to its minimum voltage position.

7. In combination, a generator having a field winding, an adjustable rheostat in the circuit of the generator field winding, a load circuit, a circuit breaker for connecting said generator to said load circuit, current limiting means in the circuit of said generator and load circuit, an overload circuit breaker for short-circuiting said current limiting means and for controlling the operation of said first mentioned circuit breaker, automatic switching means for effecting the starting of said generator and the connection of said generator to said load circuit including means for effecting the closing of said overload circuit breaker before the starting operation of said generator is completed while said rheostat is in its normal no-load voltage position and for effecting the closing of said overload circuit breaker after the starting operation of said generator is completed only when said rheostat is in its minimum voltage position.

8. In combination, a supply circuit, a load circuit, a rotary transformer having a field circuit, switching means for connecting said supply circuit to said transformer so that a relatively low starting voltage is impressed on said transformer, switching means for connecting said supply circuit to said transformer so that a relatively high running voltage is impressed on said transformer, an adjustable rheostat in said field circuit, a current limiting resistor connected in series with the load terminals of said transformer, a circuit breaker for short-circuiting said resistor, overload responsive means for effecting the opening of said circuit breaker, a second circuit breaker for connecting said transformer to said load circuit, means for controlling the operation of said second circuit breaker so that it can be closed only after said first mentioned circuit breaker is closed and is opened when said first mentioned circuit breaker is opened, means for effecting the adjustment of said rheostat to its normal no-load voltage position when said first mentioned circuit breaker is open and to its minimum voltage position when said first mentioned circuit breaker is open after said relatively high running voltage is impressed on said transformer, and means for closing said first mentioned circuit breaker while said transformer has a relatively low voltage impressed thereon if said rheostat is in its normal voltage position and for closing said first mentioned circuit breaker while said transformer has a relatively high voltage impressed thereon only when said rheostat is in its minimum voltage position.

9. In combination, a supply circuit, a load circuit, a rotary transformer having a field circuit, a starting switch for connecting said transformer to said supply circuit, a running switch for connecting said transformer to said supply circuit, an adjustable rheostat in said field circuit, current limiting means connected in series with the load circuit side of said transformer, a circuit breaker for short-circuiting said current limiting means, overload responsive means for effecting the opening of said circuit breaker, a second circuit breaker for connecting said transformer to said load circuit, means for controlling the operation of said second circuit breaker so that it can be reclosed only after said first mentioned circuit breaker is closed and is opened when said first mentioned circuit breaker is opened, means for adjusting said rheostat to its no-load voltage position whenever said first mentioned circuit breaker is open and to its minimum voltage position when said first mentioned circuit breaker is open and said running switch is closed, means controlled by said starting switch for closing said first mentioned circuit breaker when said starting switch is closed and said rheostat is in its normal no-load voltage position and for closing said first mentioned circuit breaker when said starting switch is open only when said rheostat is in its minimum voltage position.

10. In combination, a supply circuit, a load circuit, a rotary transformer having a field circuit, a starting switch for connecting said transformer to said supply circuit, a running switch for connecting said transformer to said supply circuit, an adjustable rheostat in said field circuit, current limiting means connected in series with the load circuit side of said transformer, a circuit breaker for short-circuiting said current limiting means, overload responsive means for effecting the opening of said circuit breaker, a second circuit breaker for connecting said transformer to said load circuit, means for effecting the adjustment of said rheostat to its normal no-load position when said first mentioned circuit breaker is open, means for effecting the adjustment of said rheostat to its minimum voltage position when said first mentioned circuit breaker is open and said running switch is closed, means controlled by said starting switch for closing said first-mentioned circuit breaker when said starting switch is closed and said rheostat is in its normal no-load voltage position and for closing said first mentioned circuit breaker when said starting switch is open only when said rheostat is in its minimum voltage position, a relay responsive to the relative voltages of said transformer and load circuit, means controlled by said relay and first mentioned circuit breaker for effecting while said first mentioned circuit breaker is open the adjustment of said rheostat to increase the transformer voltage if it is less than the load circuit and the closing of said second circuit breaker when the transformer voltage exceeds the load circuit more than a predetermined amount, and means controlled by said first mentioned circuit breaker for effecting the opening of said second circuit breaker when said first mentioned circuit breaker is opened.

In witness whereof, I have hereunto set my hand this 9th day of December 1929.

HERMAN BANY.